United States Patent [19]

Torrence et al.

[11] Patent Number: 4,993,231
[45] Date of Patent: Feb. 19, 1991

[54] THERMOSTATIC EXPANSION VALVE WITH ELECTRONIC CONTROLLER

[75] Inventors: Robert J. Torrence, Addison; Marvin F. Gaudette, Rockton, both of Ill.

[73] Assignee: Eaton Corporation, Cleveland, Ohio

[21] Appl. No.: 487,312

[22] Filed: Mar. 2, 1990

[51] Int. Cl.⁵ .................. F25B 39/04; F25B 49/02
[52] U.S. Cl. ........................... 62/115; 62/181; 62/184; 62/228.3.323.4; 62/DIG. 17; 62/129
[58] Field of Search .......... 62/228.1, 228.3, 184, 62/115, 181, 180, 183, DIG. 17, 126, 129; 374/27, 183, 16; 73/753, 754

[56] References Cited

U.S. PATENT DOCUMENTS

| 4,167,858 | 9/1979 | Kojima et al. | 62/129 X |
| 4,510,763 | 4/1984 | Johnson | 62/228.3 X |
| 4,835,976 | 6/1989 | Torrence | 62/115 |
| 4,841,734 | 6/1989 | Torrence | 62/181 X |
| 4,944,160 | 7/1990 | Malone et al. | 62/180 |

Primary Examiner—Harry B. Tanner
Attorney, Agent, or Firm—R. A. Johnston

[57] ABSTRACT

A refrigeration system employing a mechanical thermal expansion valve with a self-heated thermistor sensing saturation temperature at the high pressure inlet. A microprocessor based controller compares the sensed temperature with stored limits and provides output signals to a relay for cycling the condenser fan responsive to high side pressure means are provided for varying the current through the thermistor for operating same in the non-self heated mode to sense actual refrigeration temperature for generating a control signal to disable the compressor clutch when refrigerant temperature exceeds desired low limits.

7 Claims, 3 Drawing Sheets

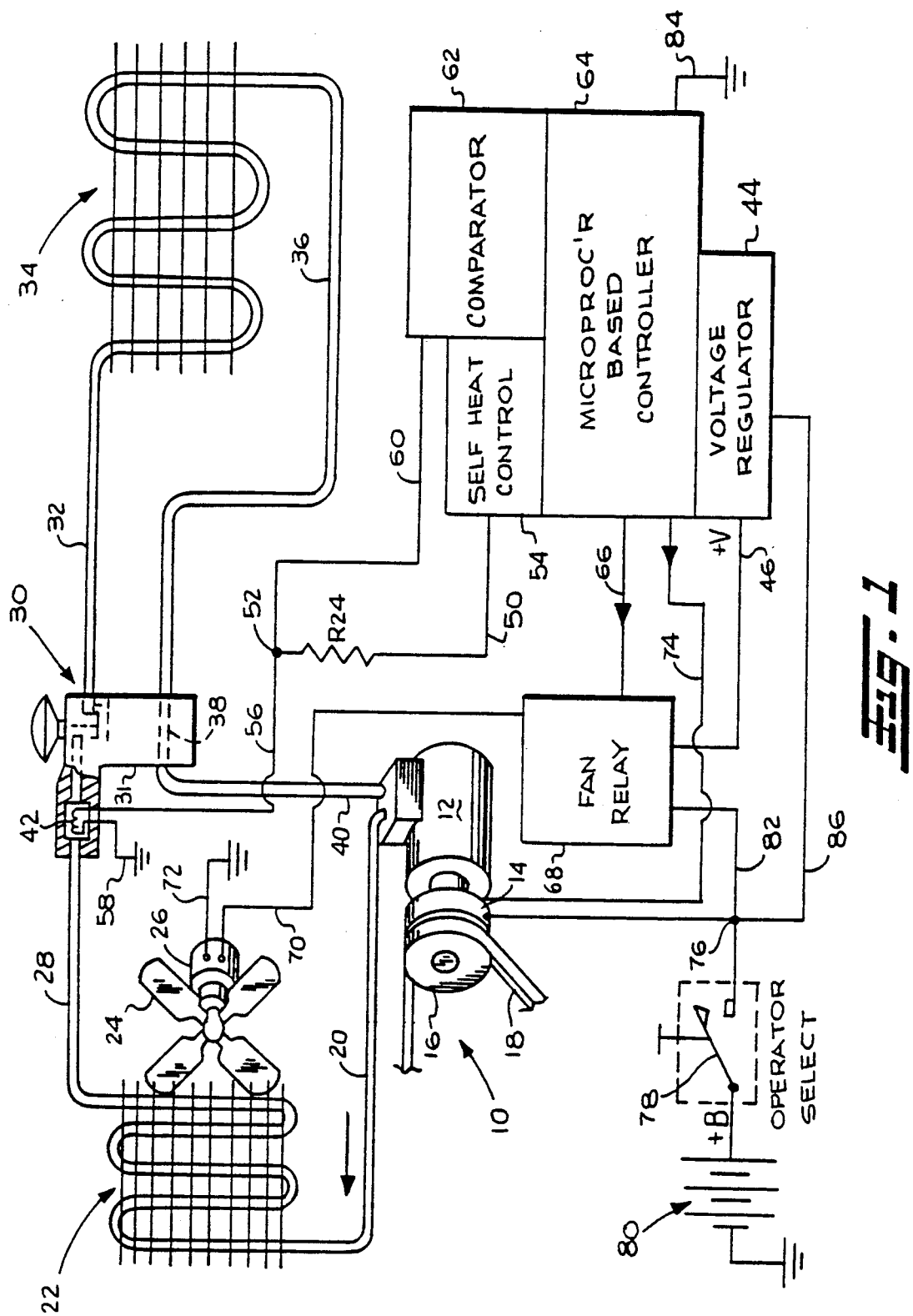

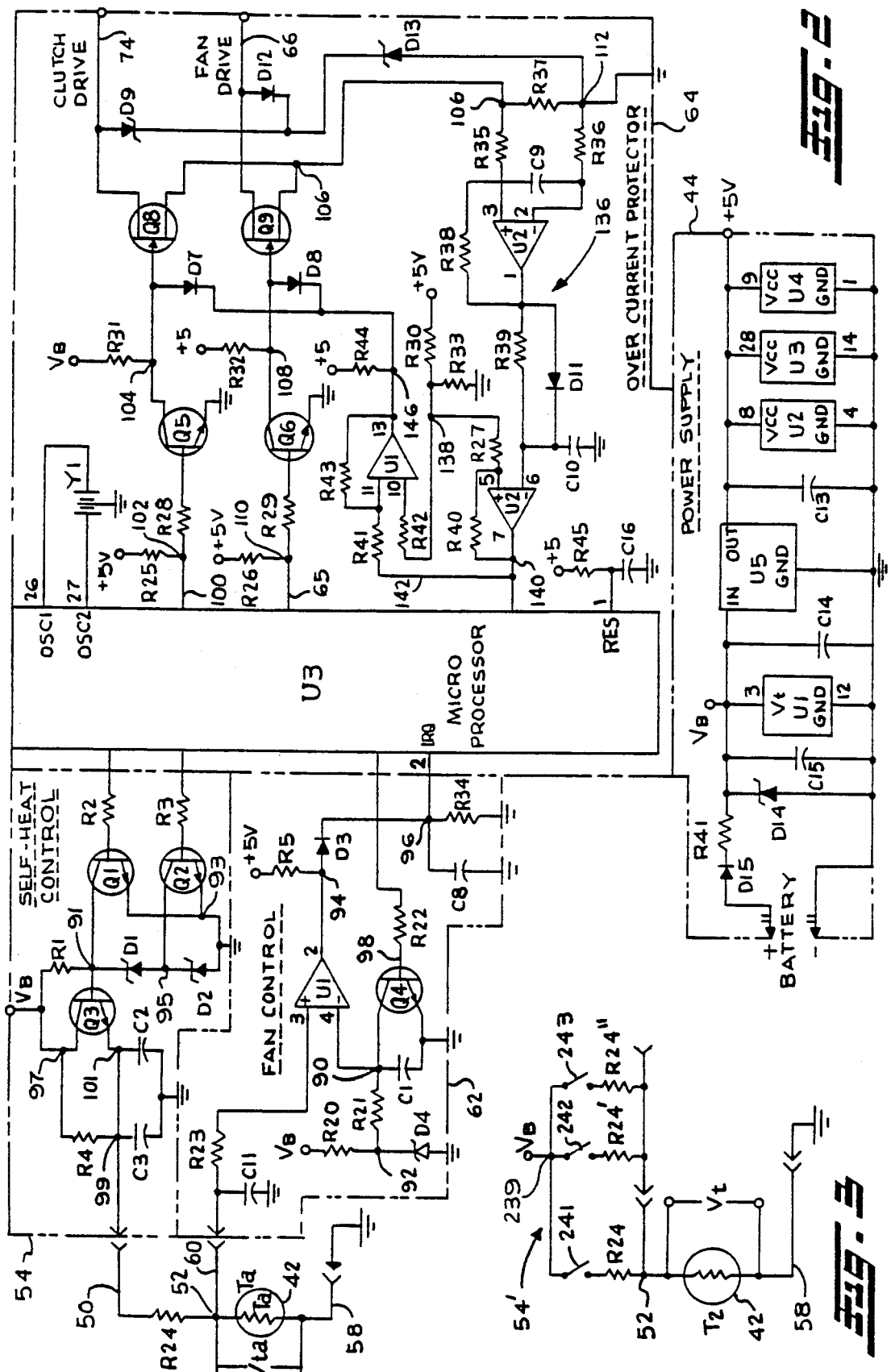

ial patent the saturation pressure
THERMOSTATIC EXPANSION VALVE WITH ELECTRONIC CONTROLLER

BACKGROUND OF THE INVENTION

The present invention relates to ways or means of controlling flow of liquid refrigerant in a liquid vapor refrigeration system of the type having a compressor for pumping pressurized refrigerant through a condenser and through an expansion means for low pressure circulation through an evaporator where heat is absorbed to effect vaporization of the liquid refrigerant and cooling the surrounding air and for returning the vaporized refrigerant to the compressor inlet. The present invention relates particularly to refrigeration systems on board an automotive vehicle for air conditioning the vehicle passenger compartment. Such automotive passenger compartment air conditioning systems are known to employ a thermal expansion valve having a liquid filled chamber in heat transfer relationship with refrigerant return flow to the compressor. Sensed changes in the temperature of the refrigerant create expansion or contraction of the liquid in the chamber to thereby provide pressure forces for moving a diaphragm to control movement of the flow control valve.

Thermal expansion valves of the above-described type are thus mechanically self-contained and function independently of the electrical controls employed for energizing and deenergizing the clutch for coupling the compressor to the vehicle engine. Heretofore, the compressor clutch has typically been energized and deenergized by a pressure switch disposed to sense the saturation pressure at the pressure discharge side of the evaporator, or in the line between the expansion valve and the evaporator inlet where there is a relatively low pressure drop across the evaporator. However, it has been desired to eliminate the pressure switch as a source of service problems, particularly leakage in the switch or its connections to the line. It has further been desired to eliminate the pressure switch in view of the cost of providing a pressure switch having sufficient proof pressure rating yet having sufficient accuracy for cycling the compressor in response to small changes in saturation pressure.

It has therefore been desired to employ a mechanical thermal expansion valve to benefit from the low cost and proven reliability thereof, and to provide an alternative to a pressure switch for cycling the compressor clutch in an automotive air conditioning system.

It has also been desired to provide a way or means of controlling an electrically operated condenser cooling fan in response to upper and lower limit conditions of refrigerant flowing from the condenser and yet retain the use of a mechanical thermal expansion valve.

It is known for example as taught in U.S. Pat. No. 4,841,734, commonly owned with the present invention, to utilize a "self-heated" thermistor having a controlled current flow therethrough and to sense the voltage drop across a resistor in series with the thermistor and to convert the voltage drop to saturation temperature from a look-up table of known properties of the thermistor in a refrigeration system and particularly an automotive air conditioning system. The corresponding saturation pressure is then determined by an algorithm of the known properties of the particular refrigerant employed. In the aforesaid patent the saturation pressure signal from a microprocessor is used to deenergize the compressor and turn "ON" the condenser fan when excessive saturation pressure is detected. The self-heated thermistor is disposed on the pressure line near the inlet to the expansion valve means.

It is also known as taught for example in U.S. Pat. No. 4,835,976, commonly owned with the present application, to employ a self-heated thermistor in the suction line between the evaporator and the compressor inlet to determine the quality of the refrigerant flowing thereover for enabling a microprocessor to generate a control signal for pulsing a solenoid to operate an electric expansion valve for controlling refrigerant flow.

It is known also, as taught in U.S. Pat. No. 4,794,762 to provide a thermistor at the inlet the mechanical expansion means for providing a refrigerant, high pressure side, temperature signal to a microcomputer for comparison with high and low limits for fan and compressor clutch cutout. A second thermistor is provided at the outlet of the expansion means and provides a low pressure side temperature signal to the microcomputer for comparison with high and low limits for service cycling of the compressor clutch.

SUMMARY OF THE INVENTION

The present invention provides for direct electrical sensing of the saturation temperature of the refrigerant, on the high pressure side, in a refrigeration or air conditioning system. A self heated thermistor is used for this purpose. The present invention utilizes a microprocessor to generate, from a look-up table of the properties of the thermistor and an algorithm of the known properties of the refrigerant, an electrical control signal to cycle the condenser fan when the saturation pressure is determined to be out of a desired range.

The thermistor is also operated in the self heated mode at a lower level of current to determine an out-of-charge condition. The thermistor is operated in a non self heated mode by a still lower level of current for direct actual refrigerant temperature measurement.

The microprocessor then compares the refrigerant temperature with preset limits and is operative for generating a control signal to cut out the compressor clutch when a low ambient temperature is sensed through by the thermistor.

The present invention employs the widely used relatively inexpensive to manufacture mechanical thermal expansion valve, with the self-heated thermistor disposed at the high pressure or inlet side of the valve.

A current limiting resistance is employed in series with the self-heated thermistor. The microprocessor based controller is operable in accordance with a predetermined strategy to control means for varying the current through the current limiting resistance means. In one embodiment the voltage to said resistance means is varied; and, in another embodiment switching means are employed to change between discrete values of current limiting resistance.

The present invention thus utilizes a self-heated thermistor to determine the saturation pressure on the high pressure side of the system for comparison with preselected limits to control cycling of the condenser cooling fan. By flowing substantially less current through the thermistor, self heating does not occur and actual refrigerant temperature is sensed for generating a control signal to disable the compressor clutch when the refrigerant temperature falls below a preset lower limit indicative of ambient temperatures for which system operation is unwarranted.

BRIEF DESCRIPTION OF THE DRAWING

FIG. 1 is a pictorial schematic of the control system of the present invention;

FIG. 2 is a schematic of the electrical circuit of the present invention; and

FIG. 3 is a portion of an electrical schematic of an alternate embodiment of the system;

DETAILED DESCRIPTION

Figure 4:
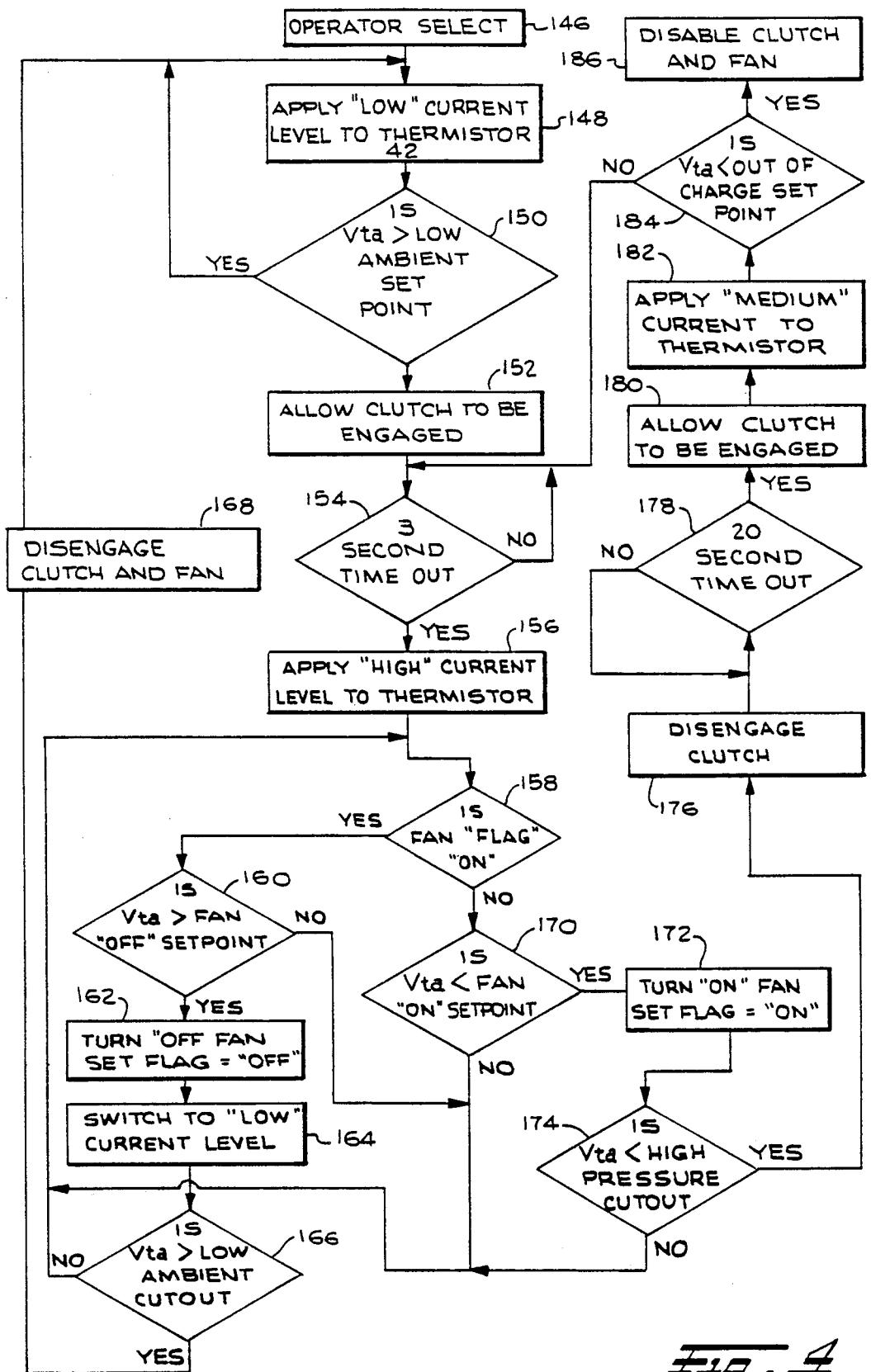
FIG. 4 is a flow diagram of the electrical control system generation of the system of FIG. 1.

Referring now to FIG. 1, the control system of the present invention, indicated generally at 10, has a refrigerant compressor 12 coupled by means of electric clutch 14 to a drive pulley 16 driven by belt 18 connected to a source of power, as for example the engine of an automotive vehicle.

High pressure gaseous refrigerant is discharged from the compressor through conduit 20 to the condenser indicated generally at 22 which is cooled by fan 24 driven by fan motor 26. Cooled liquid refrigerant discharges from the condenser through conduit 28 to the inlet of the expansion means such as the thermal expansion valve indicated generally at 30. The low pressure discharge of the thermal expansion valve 30 is discharged at the outlet thereof through conduit 32 to the inlet of an evaporator indicated generally at 34, which absorbs heat from the surrounding air such as in the passenger compartment of a vehicle for providing passenger comfort therein. Evaporator 34 discharges through conduit 36 and through return passage 38 formed through the body 31 of expansion valve 30 and through conduit 40 to the compressor suction inlet.

A self-heated thermistor 42 is disposed in the high pressure line 28, and preferably in valve body 31 at the inlet thereof, for refrigerant flow thereover. The thermistor receives a voltage from junction 52 through resistor R24 which is connected through lead 50 to self heat control 54.

In the presently preferred practice the self-heated thermistor 42 is an NTC thermistor manufactured by Fenwall Electronics, 63 Fountain Street, Farmingham, Mass. 01701 bearing manufacturer's identification FD21J1-W, and has a resistance of 100 OHMS at 25 degrees C. Junction 52 is also connected through lead 60 to one input of a comparator 62 which is controlled by the microcomputer of microprocessor based controller 64, which is powered by a suitable power supply including voltage regulator network 44.

A drive signal is provided along lead 66 from controller 64 to fan relay 68 which controls the fan motor 26 along lead 70. Fan relay 68 receives power for the motor along lead 82 from junction 76 The motor 26 has the opposite side thereof connected to the system ground along lead 72.

The controller 64 also connected along lead 74 to the compressor clutch 14 which receives power through junction 76 which is powered through the operator select switch 78 and the vehicle power supply indicated generally at 80. The controller 64 has its ground connected through lead 84 to the system ground; and, the voltage regulator 44 receives power through lead 86 and junction 76.

Referring now to FIG. 2, the circuit schematic for the control system is shown wherein the power limiting resistor R24 receives power from the self-heat control circuit 54 along lead 50 and supplies current through junction 52 to the self-heated thermistor 42 which is grounded through lead 58 to the system ground.

The voltage at junction 52 comprises a reference voltage and is also applied along lead 60 through resistor R23 and to the positive input of a comparator comprising a portion of device U1, at pin 5 thereof; and, U1 forms a part of comparator circuit 62 of FIG. 1. The negative input at pin 4 of U1 is connected through junction 90 to the collector of a transistor switch Q4 which has its emitter grounded; and, the base of Q4 receives a signal along lead 98 through resistor R22 from the microprocessor U3.

The microprocessor U3 employed in controller 64 in the present practice has a manufacturer's designation MC68HCO5TK and is available from Motorola Semiconductor products, 2060 Algonquin Road, Schaumburg, Ill. 60195.

The junction 90 is biased by the system volta $V_B$ from power supply 44 through resistors R20 and R21. Junction 92 between R20 and R21 is connected to ground through a reverse poled zener diode D4.

The comparator U1 has its output at pin 2 thereof connected through junction 94 which is biased through R5 by the five volt supply and through forward poled diode D3 and through junction 96 to pin 2 of the microprocessor U3. Junction 96 is protected against transients by capacitor C8 and resistor R34 which are connected to ground.

The microprocessor U3 includes a ceramic resonator Y1 which provides a source of timing to the microprocessor through pins 27 and 28; and, in the presently preferred practice the resonator Y1 acts as an oscillator having a frequency of preferably four megaHertz.

The control circuit of the present invention receives power from the network 44 which includes a voltage regulator device U5 which provides a regulated five (5) volts D.C. The voltage regulator U5 is available from Motorola and has a manufacturer's designation MC7805BTD.

The device U5 is protected by capacitor C14 at the input and C13 at the output. Additional transient suppressors comprising diode D15 and resistor R41 in series therewith and zenior diode D14 and capacitor C15 in parallel therewith. The network 44 provides a source of five volt power to the solid state devices U2, U3 and U4; and also provides voltage $V_B$ of approximately 11-12 volts for powering other circuit components such as devices U1 and Q3.

The self-heat control 54 employs a transistor switch Q1 receiving a signal from the microprocessor U3 through resistor R2 to the base thereof. The collector of Q1 is biased at junction 91 by the system voltage $V_B$ through resistor R1. The emitter of Q1 is grounded through junction 93. Junction 91 is connected through reverse poled zener diode D1 to junction 95, which is also connected through a reverse poled zener diode D2 to ground. Junction 95 is also connected to the collector of switch Q2 which has its emitter connected to grounded junction 93 and its base receiving a signal through resistor R3 from the microprocessor U3.

Junction 91 is also connected to the base of switch Q3 which has its collector connected to junction 97 which is biased by the system volta $V_B$. Junction 97 is also connected through resistor R4 to junction 99 which is connected through capacitor C3 to ground. Junction 99 is also connected to lead 50 to provide current through resistor R24. Switch Q3 has its emitter connected through junction 101 and capacitor C2 to ground; and, junction 101 is also connected to junction 99.

In operation, when a high level of self-heating is desired of thermistor 42 for purposes of determining saturation pressure for condenser fan control, switches Q2 and Q1 remain "OFF". Q3 has its base biased by $V_B$ through R1 to a regulated voltage of 11.1 volts by zener diodes D1 and D2. Q3 thus conducts applying almost 11 volts to junctions 101 and 99 and to R24 for maximum current flow through thermistor 42.

When a low level of self-heating of thermistor 42 is desired for purposes of still determining saturation pressure and detecting insufficient refrigerant charge, the microprocessor U3 provides a signal through R3 to the base of Q2, turning Q2 "ON", thereby grounding junction 95 and diode D1. The voltage at junction 91 is lowered to about 5.1 volts turning Q3 "ON", which applies about 4.9 volts to R24.

In operation, when the limited current flowing through the self-heated thermistor 42 causes boiling of the refrigerant thereon, variations in the saturation temperature are sensed by detecting changes in the voltage drop across the resistor R24 as the voltage at junction 52, which is applied through resistor R23 to the positive input at pin 5 of U1.

This technique of determining the saturation pressure by measuring the saturation temperature is known and is described in the aforesaid U.S. Pat. No. 4,841,734 and further detail herein is omitted for the sake of brevity.

When it is desired to operate thermistor 42 in a non-self-heated mode, that is with insufficient current to boil refrigerant impinging thereon, the voltage $V_{ta}$ across the thermistor may be measured for purposes of reading actual refrigerant temperature The compressor clutch may then be cut-out by the microprocessor when the temperature signal from thermistor 42 provides an indication of ambient temperature below that which warrants compressor operation.

In this latter mode of operation, Q1 receives a signal through R2 from the microcompressor U3 and is turned "ON" thereby grounding junction 91 and the base of Q3. R24 is thereby biased by the low voltage at junction 99, which is $V_B$ dropped through the 1K Ohm resistor R4 resulting in very low current flow through thermistor 42. At low ambient temperatures thermistor 42 has a much higher resistance than the normally rated 18 Ohms; and, the voltage-temperature characteristics become non linear, thereby precluding operation in the self heated mode.

The microprocessor then compares the voltage represented by the count with values in a look-up table for the particular refrigerant; and, the temperature derived from the table is assumed to be actual refrigerant temperature.

Upon receipt of a signal from the device U3 along lead 98 through R22 to the base of Q4, Q4 is turned "ON"; and, Q4 keeps capacitor C1 discharged when Q4 is "ON". When the microprocessor turns Q4 "OFF" capacitor C1 charges; and the microprocessor starts counting internally. As the voltage on C1 at junction 90 to pin 4 exceeds the voltage on pin 5 of comparator U1, U1 conducts and provides a signal transition through junctions 94 and 96 and pin 2 of the microprocessor; and, the microprocessor stops counting. The microprocessor U3 then reads the count and from a look-up table of known properties of the particular refrigerant employed U3 determines the temperature.

The microprocessor is operative in response to saturation temperature measurement by measuring $V_{ta}$, when thermistor 42 is operated in the self heated mode, to provide an output signal along line 65 through resistor R29 to the base of transistor switch Q6. The microprocessor turns Q6 "OFF" at 180 psi (1242KPa) to disable the condenser from in the presently preferred practice.

Q6 has its emitter grounded and collector connected through junction 108, which is biased through resistor R32 by the system voltage $V_B$. The input to the base of Q6 is biased through R26 by the five volt system power at junction 110 which is connected through R29 to the base of Q6.

Junction 108 is connected to the base of the power switch device Q9 which has its output pin connected through lead 66 to the fan relay 68; and, the remaining output pin is connected to ground through junction 106.

In operation, when the thermistor 42 senses the saturation pressure above 240 psi (1656KPa) microprocessor U3 provides a signal along lead 65 to turn off Q6 which in turn turns on Q9 to energize the fan relay. When the thermistor 42 senses saturation pressure above 350 psi (2415KPa) the microprocessor turns Q6 "ON" and Q9 "OFF" deenergizing the fan relay and compressor clutch.

If the saturation temperature is above a desired value, the microprocessor is operative to emit a signal along lead 100 to Q5 which in turn turns Q8 "ON" to energize the compressor clutch. When the temperature as measured by thermistor 42 is determined to be below a second predetermined value, the microprocessor is operative to turn "ON" Q5 and turns Q8 "OFF" to deenergize the compressor clutch 14.

Microprocessor U3 provides an output signal along lead 100 to junction 102 and through resistor R28 to the base of transistor Q5, which has its emitter grounded and its collector connected to junction 104. Junction 104 is biased through resistor R31 by the voltage $V_B$ and connected to the base of power switch device Q8, which applies power through its output junction along lead 74 to the compressor clutch 14.

Q5 is turned "ON", causing Q8 to be turned "OFF" by the microprocessor U3 when the temperature measured by the thermistor 42 is below 18 degrees F, and turned "ON" when the temperature measured by 42 is greater than 40 degrees F. The remaining lead of power switch Q8 is connected through junction 106 which is connected through resistor R37 to ground for completing the circuit to the compressor clutch.

The output drivers Q8 and Q9 have their output lines protected against transients by the diode network comprising forward poled zener diode D9 connected to lead 74 and forward poled diode D12 connected to lead 66 in series with reversed poled zener diode D13 connected to junction 112.

An overcurrent protection circuit is provided, indicated generally at 136, and utilizes resistor R37. The output current through drivers Q8, Q9 is sensed by R37 through junction 106. If either the compressor clutch or the fan relay load is shorted, a greater voltage drop occurs across R37; and, this voltage drop is applied through resistors R36, R35 as inputs at pins 2 and 3 of an amplifier comprising device U2. The output at pin 1 of U2 is applied through resistor R39 to the negative input at pin 6 of comparator portion of device U2 which has the positive input at pin 5 biased through resistor R27 to a reference voltage from junction 138. Junction 138 is biased by a voltage divider network comprising resistor R30 and R33 connected in series, with R30 supplied with five volts regulated and R33 grounded, thus providing the voltage:

$$V_{138} = \frac{(R33)}{(R30 + R33)}$$

When the voltage at input pin 6 of comparator U2 is equal to or greater than a reference voltage applied to pin 5 of U2, U2 conducts at output pin 7 through junction 140. Junction 14 is connected to an input of the microprocessor and also along lead 142 through resistor R41 to pin 11 of the positive input of a comparator portion of U1. The negative input pin 10 of a comparator portion of U1 is biased through resistor R42 with $V_{138}$.

When the voltage output of U2 at pin 7 and junction 140 as applied to pin 11 of U1 is less than the reference voltage $V_{138}$, U1 conducts through output pin 13. Pin 13 is connected to junction 146, which is connected through reverse poled diodes D7, D8 to the base of Q8 and Q9, thereby turning "OFF" Q8 and Q9 and stopping the overcurrent condition. Junction 146 is biased by the system voltage $V_B$ through resistor R44; and, the output at pin 13 of U1 has a positive feedback resistor R43 connected to pin 11 at the input of U1.

When the amplifier U2 conducts at pin 1, a capacitor C10 connected between pin 6 of U2 and ground, is charged. When Q8 and Q9 are turned "OFF", the voltage drop across R37 ceases and output of U2 at pin 1 goes low; however, C2 maintains a charge on input pin 6 of comparator U2 so that the output of U2 at pin 7 remains low thereby holding Q8 and Q9 "OFF" until capacitor C10 bleeds down through resistor R39. Diode D11, which is forward poled from output pin 1 of U2 to capacitor C10, provides a fast charge path for capacitor C10 and prevents a fast discharge to prevent oscillatory action. D13 is provided for protection against transients or spikes due to the inductance of the load.

Referring to FIG. 3, an alternate embodiment of the self-heat control indicated generally at 54' is shown wherein resistor R24 is connected to $V_B$ at junction 239 through switch 241 which is shown as manually operated, but may be electronic switch controlled by microprocessor U3.

A second resistor R24' is connected to junction 52 in parallel with R24 and is connected to $V_B$ through switch 242 to junction 239. Switch 242 although shown manually operated, may be electronically controlled by microprocessor U3. Resistor R241 is of the order of 120 Ohms and provides a low level of self-heat for out-of-charge determination.

A third resistor R24" is connected to junction 52 and also in parallel with R24, through switch 243 to junction 239 and $V_B$. R24" is a high resistance of the order of 1000 Ohms; and, when switch 243 is closed, operates thermistor 42 in the non-self-heated mode as described hereinabove for purposes of detecting low ambient temperature and effecting compressor cut-out. Switch 243 although shown mechanically actuated, may be electronic and controlled by microprocessor U3.

Referring now to FIG. 4, the microprocessor is powered up to the system twelve volts and the system mode of operation selected at step 146 by closure of switch 78 (see FIG. 1).

Initially, a low current level is supplied through thermistor 42 at step 148 by the microprocessor turning "ON" transistor switch Q3 in the FIG. 2 schematic or closing switch 243 in the FIG. 3 embodiment.

A determination is then made at step 150 whether the voltage $V_{ta}$ across thermistor 42 is greater than the low ambient setpoint of 4° C.; and, if this is the case, the system returns to step 148. However, if the $V_{ta}$ is not greater than the low ambient setpoint at step 150 the systems proceeds to step 152 wherein the compressor clutch is permitted to engage.

At step 154, a determination is made as to whether a 3 second time-out has elapsed; and, if not, the system returns to step 154. After the 3 second time elapse, the system proceeds to apply the maximum current level to thermistor 42 at step 156, which is accomplished either by maintaining transistors Q1 and Q2 in "OFF" condition in the FIG. 2 schematic or, by closing switch 241 in the FIG. 3 embodiment.

The system proceeds to step 158 wherein a determination is made as to whether the condensor fan "Flag" is "ON". If the condensor fan is determined to be "ON" at step 158, the system proceeds to step 160 where a determination is made as to whether a $V_{ta}$ is greater than the condensor fan "OFF" set point which in the presently preferred practice is voltage of 5.8 volts measured across the thermistor 42. If the voltage $V_{ta}$ measured at step 160 is not greater than the fan "OFF" setpoint, the system returns to step 158.

However, if $V_{ta}$ measured at step 160 is greater than the fan "OFF" setpoint, the system proceeds to step 162 and turns the fan "OFF" and sets the "OFF" flag. The program then proceeds to step 164 and switches to the "low" level of current for the thermistor 42 and then proceeds to step 166.

At step 166 a determination is made as to whether a voltage $V_{ta}$ measured across the thermistor 42 is greater than a low ambient cut out temperature of 4° C. which corresponds to 1.9 volts for $V_{ta}$. If $V_{ta}$ is not greater than a low ambient cutout temperature which corresponds to 1.9 volts, the systems returns to step 158. However, if the $V_{ta}$ is greater than the low ambient cutout equivalent of 1.9 volts, the clutch and fan are disengaged at step 168; and, the system returns to step 148.

Returning to step 158, if the "ON" flag is not "ON" the system proceeds to step 170; and, a determination is made whether the voltage $V_{ta}$ across the thermistor 42 is less than the fan "ON" setpoint temperature which corresponds to 5.4 volts. If $V_{ta}$ is less than 5.4 volts at step 170, the system proceeds to step 172 and the fan is turned "ON" and the "ON" flag is set. A determination is then made at step 174 whether the voltage $V_{ta}$ across thermistor 42 is less than the high pressure cutout value which corresponds to a voltage of 3.6 volts and if not, the system returns to step 158.

However, if $V_{ta}$ is less than the high pressure cutout value corresponding to a voltage of 3.6 volts across thermistor 42, the system proceeds to disengage the clutch at step 176. A 20 second time delay is then provided at step 178 after which the system permits the clutch to be engaged at step 180.

With the clutch engaged at step 180, the system then applies "medium" current through thermistor 42 at step 182. With the medium current applied to thermistor 42, to maintain a low level of super heat on the thermistor 42, a determination is made at step 184 as to whether voltage across thermistor 42, $V_{ta}$ is less than the out-of-charge setpoint which corresponds to the voltage of 2.2 volts. If this is not the case, the system proceeds to step 154. However, if the voltage $V_{ta}$ is less than 2.2 volts, the system disables both the clutch and the fan at step 186.

Values of resistances and capacitances and device designations are given in Table I.

TABLE I

| Resistances | OHMS | Capacitance MicroFarads | | Other Devices | |
|---|---|---|---|---|---|
| R1 | 470. | C1,3 | .1 | U1 | LM239 |
| R4 | 1K | C2 | 1.0 | U2 | LM2940D |
| R5,7 | 10K | C8 | .01 | U3 | MC68HC04TK |
| R17 | 1.5K | C10 | .15 | U5 | MC7805BTD |
| R20 | 100 | C11 | .001 | D1 | 5.IVZ |
| R21 | 200K | C13,14 | .1 | D2 | 6.2V |
| R22 | 2.2K | C19,16 | 3.3 | D3. | MMBD914 |
| R23 | 270K | | | D4 | 10VZ |
| R24,41. - 18 - 2 W | | | | D7,8 | MMBD914 |
| R24' | 120 | | | D9 | RLR4004 |
| R25,26 | 10K | | | D11 | MMBD914 |
| R27 | 9.1K | | | D12 | RLR4004 |
| R28,29 | 2200 | | | D13 | TGL-41-51 |
| R30-36 | 10K | | | D14 | MLL4746,18V |
| R37 | .006 | | | D15 | RLR4004 |
| R38,40,43 | 100K | | | Q3 | MJD31C |
| R39 | 330K | | | Q4-6 | MMBD3904 |
| R41,41,45 | 22K | | | Q8,9 | IFR020 |
| R45 | 33K | | | | |

The present invention thus provides a unique and novel control system for a refrigeration or air conditioning system wherein a mechanical thermal expansion valve is employed but a thermistor is disposed in the system to sense high side refrigerant temperature electrically, thereby enabling a microprocessor controller to provide control signals for the electrically operated compressor clutch and condenser fan motor.

The present invention employs a self-heated thermistor at the inlet or high pressure side of the thermal expansion valve. The thermistor is operated in a high current mode to effect boiling of refrigerant impinging thereon to enable determination of saturation temperature in the high pressure side of the system for providing signals to cycle the condenser fan. The same thermistor is also operated in a low current mode as a direct refrigerant temperature sensing thermistor on the basis that the temperature measured is saturation temperature to enable a comparison with preset limits to provide an electrical control signal for disabling the compressor clutch at ambient temperatures below a predetermined threshold.

The present invention thus provides a unique and novel system for electronically controlling the compressor clutch and condenser fan in an air conditioning system and yet permits the use of a economical and reliable mechanical thermal expansion valve.

Although the invention has hereinabove been described with respect to the illustrated embodiments, it will be understood that the invention is capable of modification and variation and is limited only by the following claims.

We claim:

1. A structural assembly for controlling operation of a refrigeration system comprising:
   (a) compressor means operable, upon energization, to circulate a flow of pressurized refrigerant;
   (b) condenser means receiving pressurized refrigerant from said compressor means and operable to liquify said refrigerant;
   (c) expansion means receiving liquified refrigerant from said condenser means and discharging said refrigerant at a substantially reduced pressure therefrom;
   (d) evaporator means receiving said reduced pressure liquified refrigerant from said expansion means and operable to absorb heat from the surrounding air and discharge vaporized refrigerant therefrom;
   (e) an means operative upon energization to direct a flow of cooling air to said condenser means;
   (f) clutch means operable upon actuation to effect energization of said compressor means;
   (g) thermistor means disposed to have said liquid refrigerant entering said expansion means flowing thereover;
   (h) first circuit means including limit resistor means operable to provide a flow of current through said thermistor means for effecting boiling of said refrigerant impinging on said thermistor means including means operative to compare the voltage on said thermistor means a reference, and including microcomputer means operative to determine the saturation temperature of said refrigerant and from a look up table of refrigerant determine the saturation pressure, said microcomputer means operative to provide an output control signal for performing a system function selected from the group consisting of (a) cycling said fan means; (b) control said clutch means when said saturation temperature exceeds predetermined limits; and,
   (i) second circuit means selectively operative to vary the current flow through said thermistor means for permitting or preventing self-heating of said thermistor means.

2. The structural assembly defined in claim 1, wherein said first circuit means includes a plurality of limit resistors and switch means actuatable for selecting one resistor from among said plurality .

3. The structural assembly defined in claim 1, wherein said first circuit means includes a plurality of limit resistors and electronic means operable to switch selectively one of said plurality.

4. A method of controlling a refrigeration system for the type having compressor circulating refrigerant through a condenser then through an expansion means and then through an evaporator and then returning to the compressor comprising the steps of:
   (a) providing a thermistor in the refrigerant flow between the condenser and the expansion means;
   (b) flowing a first level of electrical current through said thermistor and heating said thermistor sufficiently to boil refrigerant impinging thereon and measuring the voltage across said thermistor;
   (c) comparing said measured voltage with a table of known properties of said thermistor for determining the saturation temperature of the flow;
   (d) providing a blower for directing a flow of air over said condenser and energizing said blower when saturation temperature exceeds a preselected upper limit and disabling said blower when said saturation temperature reaches a preselected lower limit;
   (e) flowing a second substantially lower level of current through said thermistor insufficient to boil refrigerant impinging thereon and measuring the voltage across said thermistor; and
   (f) comparing voltage measured with known properties of said thermistor and determining the refrigerant flow temperature disenabling the compressor when said temperature is below a preselected threshhold.

5. The method defined in claim 4, further comprising the steps of:
   (a) flowing a third level of current significantly less than said first level, through said thermistor and heating said thermistor sufficiently to boil refrigerant impinging thereon and measuring the voltage across said thermistor;
   (b) comparing said measured voltage with known properties of said thermistor and determining the saturation temperature of said flow; and
   (c) disabling said compressor when said saturation temperature is less than a threshold indicative of loss of refrigerant.

6. The method defined in claim 4 wherein the steps of flowing said first and second levels of current through said thermistor include the step of varying the voltage applied to said thermistor 7. The method defined in claim 4 wherein the step of flowing said first and second levels of current includes the step of providing a current limiting resistor electrically in series with said thermistor and selectively switching one of a plurality of such resistors in circuit.

* * * * *